United States Patent
Merrell et al.

[11] 3,769,858
[45] Nov. 6, 1973

[54] TRANSMISSION

[75] Inventors: Richard L. Merrell, Huron;
Lubomyr O. Hewko, Port Clinton;
Richard K. Kepple, Huron, all of
Ohio

[73] Assignee: General Motors Corporation,
Detroit, Mich.

[22] Filed: Mar. 3, 1972

[21] Appl. No.: 231,504

[52] U.S. Cl. ............................ 74/752 E, 192/104 C
[51] Int. Cl. ...................... F16h 5/60, F16d 43/22
[58] Field of Search .................. 192/104 C, 104 B,
192/104 R, 103 B; 74/752 E

[56] References Cited
UNITED STATES PATENTS

| 462,028 | 10/1891 | Ballard | 192/104 R |
| 2,355,710 | 8/1944 | Dodge | 192/103 B |
| 2,398,087 | 4/1946 | Dodge | 192/104 B |
| 2,432,591 | 12/1947 | Schuckers | 192/104 R |
| 2,455,435 | 12/1948 | Nader et al. | 192/104 C X |
| 2,514,228 | 7/1950 | Dodge | 192/104 C |
| 3,702,084 | 11/1972 | Kepple et al. | 74/752 E |

*Primary Examiner*—Charles J. Myhre
*Assistant Examiner*—Thomas C. Perry
*Attorney*—Warren E. Finken et al.

[57] ABSTRACT

The illustrated two-speed accessory drive transmission includes centrifugal clutch shoes and a planetary friction unit, with spring means for urging the shoes into frictional driving contact with a clutch drum and thereby actuating the planetary unit during low engine speeds for driving the output member in overdrive, and a one-way clutch for interconnecting the output and input in a direct drive relationship upon disengagement of the shoes from the clutch drum under the action of centrifugal force, with a pin or roller mounted between an input member and a ramp formed on the clutch shoes to control disengagement of the clutch at a first predetermined speed and the reengagement thereof at a lower predetermined speed than the first predetermined speed, in both instances without undue slippage.

16 Claims, 7 Drawing Figures

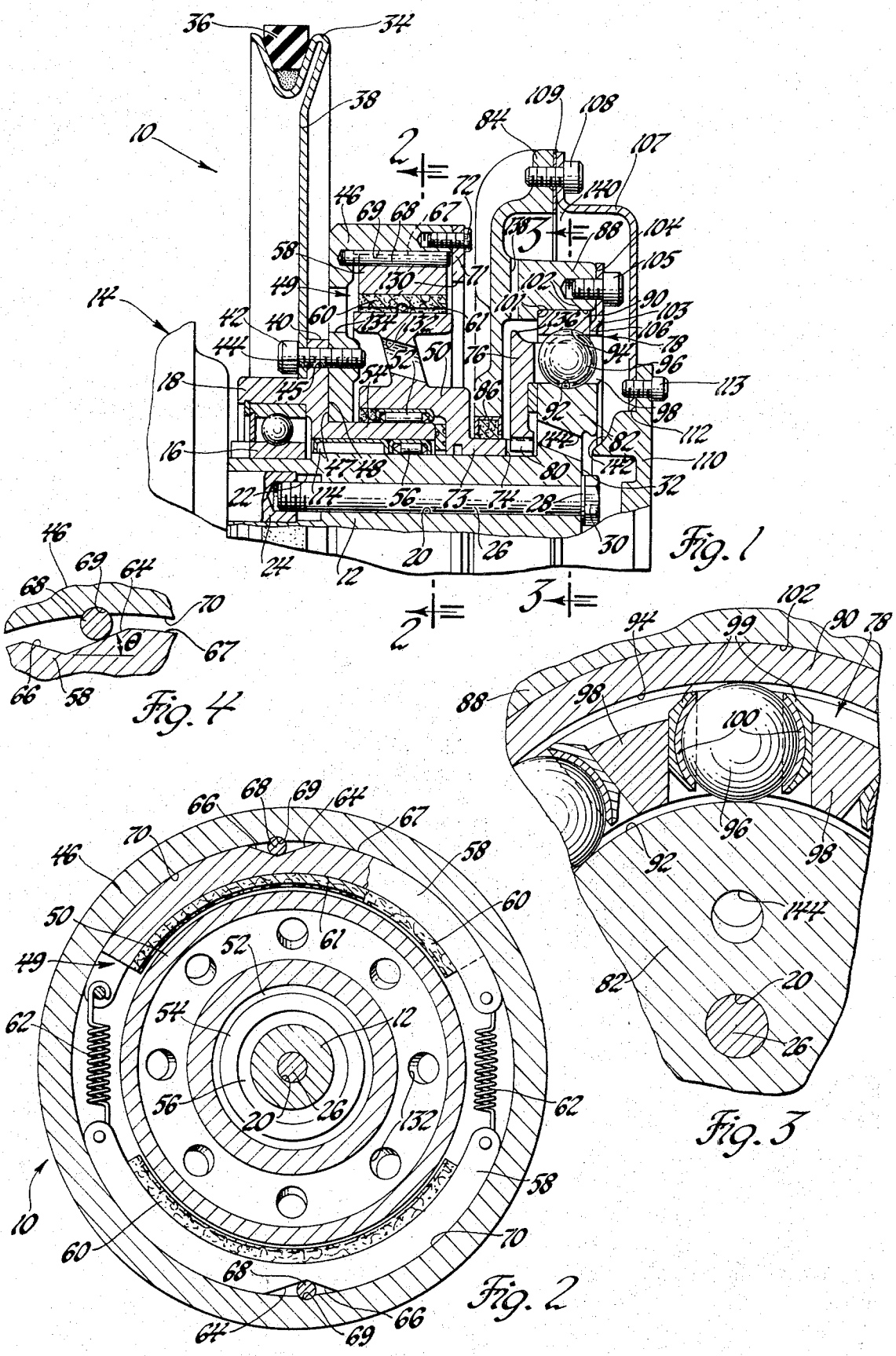

TRANSMISSION

This invention relates generally to transmissions and, more particularly, to two-speed transmissions.

This invention provides an improved transmission for driving engine accessories at two different speed ratios with respect to engine speed, while having the clutch thereof disengage at high speeds and reengage at substantially lower speeds. More specifically, it may be desirable to increase the speed of an engine accessory, such as the air injection pump, to increase pumping capacity at low engine speeds and then, at a predetermined higher engine speed, to drive the accessory at a 1:1 speed ratio therewith to reduce further increase in pumping capacity, and then to retain the lower pumping capacity to a particular speed lower than the above-described predetermined higher engine speed.

Accordingly, an object of the invention is to provide improved means for operating various engine accessories at two different speed ratios with respect to engine speed with different controlled change-over speeds during acceleration and deceleration.

Another object of the invention is to provide improved centrifugally-actuated engaging and disengaging means for controlling the engaging and disengaging operations between the input and a ball friction planetary unit over predetermined speed ranges such that the releasing speed is a predetermined amount higher than the engaging speed in order to eliminate hunting when the speed changes are small.

A further object of the invention is to provide an improved spring-loaded centrifugal weight means for disconnecting a ball planetary drive unit from the input and actuating a one-way clutch at a first predetermined engine speed, and reconnecting the planetary drive unit with the input at a second lower predetermined engine speed.

A still further object of the invention is to provide spring-loaded centrifugal clutch shoes cooperating with a roller and ramp mechanism for disconnecting a friction clutch and a ball planetary drive unit from the input without undue slippage therebetween and actuating a one-way clutch at a first predetermined engine speed, and reengaging the clutch, again, without undue slippage, and, hence, reactivating the planetary drive unit at a second lower predetermined engine speed.

These and other objects and advantages of the invention will be apparent when reference is made to the following description and accompanying drawings, wherein:

FIG. 1 is a fragmentary cross-sectional view of an accessory drive mechanism embodying the invention;

FIG. 2 is a cross-sectional view taken along the plane of line 2—2 of FIG. 1, as if FIG. 1 were a full round view, and looking in the direction of the arrows;

FIG. 3 is an enlarged fragmentary cross-sectional view taken along the plane of line 3—3 of FIG. 1, as if FIG. 1 were a full round view, and looking in the direction of the arrows;

FIG. 4 is an enlarged fragmentary cross-sectional view of a portion of the FIG. 2 structure in a different operational position from that of FIG. 2;

Figure 5:
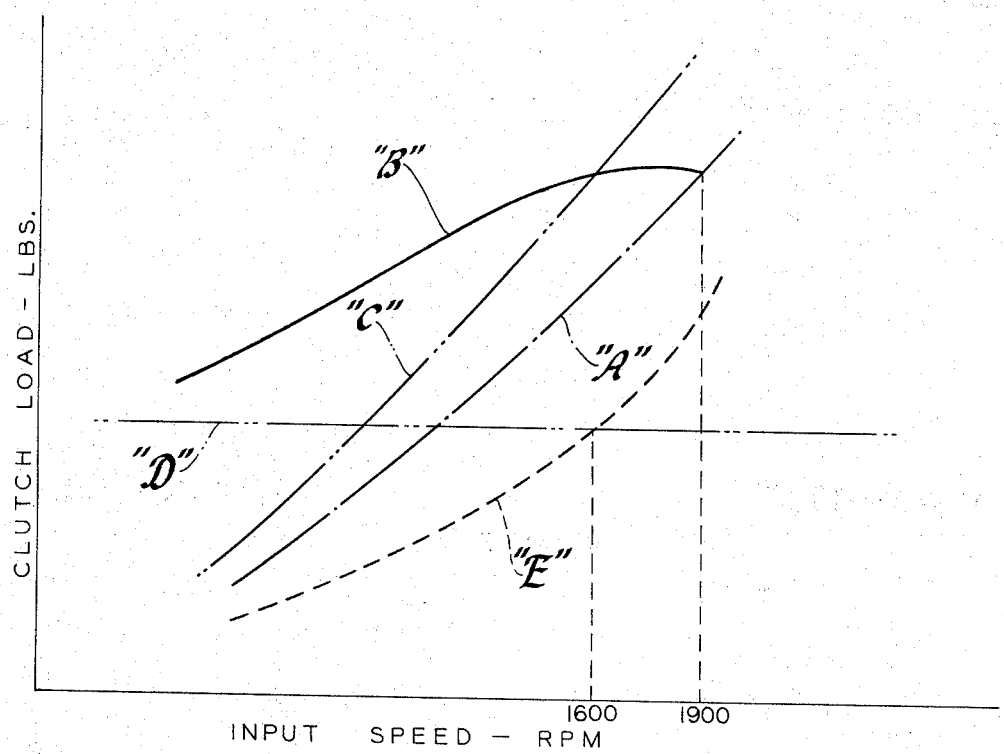
FIG. 5 is a graphic representation of operational characteristics of the invention.

Referring now to the drawings in greater detail, FIG. 1 illustrates a two-speed accessory drive mechanism 10 including an output or accessory drive shaft 12 suitable for connection with a predetermined engine accessory, represented generally at 14, such as an air injection pump. The shaft 12 is rotatably mounted in bearings 16 supported within a pulley hub 18. The accessory drive shaft 12 includes a central passageway 20 and a recessed end portion 22. An internally threaded extended shaft end 24 of the accessory drive mechanism 10 is inserted in the recess 22 and secured therein by a bolt 26 extending through the central passageway 20 and threadedly connected to the internally threaded shaft end 24. A washer 28 is mounted between a head 30 of the bolt 26 and the end face 32 of the accessory drive shaft 12.

An input pulley 34, driven by a belt 36 and including an inwardly extending flange 38, is secured to an outwardly extending flange 40 formed on the pulley hub 18 by bolts 42 mounted through aligned openings 44 and 45 formed in the flanges 38 and 40, respectively, the bolts 42 being threadedly secured to a cup-shaped rotatable housing member 46 whose end face 47 abuts against the adjacent face 48 of the flange 40.

A centrifugal clutching arrangement 49 is mounted in the housing member 46. The arrangement 49 includes a clutch drum 50 mounted on needle bearings 52 around a sleeve extension 54 of the pulley hub 18, the sleeve extension 54 being mounted on needle bearings 56 around the output shaft 12. A pair of centrifugal clutch shoes 58, including frictional linings 60 bonded to their radially inner surfaces 61, is mounted around the clutch drum 50, the shoes 58 being urged toward the drum 50 by springs 62 (FIG. 2) interconnected between oppositely disposed ends of the shoes 58.

Converging ramps 64 and 66 (FIG. 2) are formed on the radially outer surface 67 of each shoe 58 at an intermediate location thereon. A ramp pin or roller 68 is mounted in each set of converging ramps 64 and 66 formed in each shoe 58 and retained radially in a pocket 69 formed in the inner surface 70 of the housing member 46. A cover 71 is secured by bolts 72 to the end face of the housing member 46, axially retaining the ramp pins 68.

A flanged extension 73 is either secured to or formed on the clutch drum 50 so as to extend around an intermediate portion of the output shaft 12. The flanged extension 73 may be formed of steel and secured to the clutch drum 50 which may be formed of cast iron, or the extension 73 may be formed integrally with the clutch drum 50 and formed of a single selected material. A plurality of axial slots 74 are formed on the end of the flanged extension 73.

A carrier member 76 of a planetary friction drive mechanism 78 includes internally formed ribs 80 which mesh with the axial slots 74 on the clutch drum extension 73. A sun member 82 of the planetary friction drive mechanism 78 is formed integrally with the accessory drive shaft 12. A fixed housing member 84 is mounted around the flanged extension 73, with a suitable seal 86 mounted therebetween. An outer ring retainer 88 is formed on the housing member 84 to radially confine an outer ring member 90 of the planetary unit 78. Toroidal surfaces 92 and 94 are formed on oppositely disposed portions of the sun member 82 and the outer ring member 90, respectively, providing for the mounting therein of ball planet pinions 96 and the axial alignment of the sun member 82 and the outer ring member 90. The ball planet pinions 96 are mounted in the toroidal surfaces 92 and 94 such that the preload thereacross is a predetermined amount, depending upon the application involved. The ball planet pinions 96 are separated and driven by equally spaced fingers 98 extending axially from the carrier member 76. Inserts or shoes 99 (FIG. 3) having aluminum or other suitable linings 100 bonded thereon may be inserted on opposite sides of each ball planet pinion 96 so as to be slidably and rotatably mounted against the adjacent fingers 98 for better alignment and wear characteristics.

The outer ring member 90 is retained against a shoulder 101 (FIG. 1) formed on the inner surface 102 of the outer ring retainer 88 by a retaining clamp 103 secured to the end face 104 of the outer ring retainer 88 by bolts 105, and abutted against the adjacent face 106 of the outer ring member 90.

An end cover 107 is secured to the fixed housing member 84 by means of bolts 108 and a gasket 109. A separate end cap 110 covers a central opening 112 in the end cover 107 and is secured thereto by bolts 113, providing access to the bolt 26.

A one-way clutch 114 is mounted around the output shaft 12 within the sleeve extension 54 of the pulley hub 18, intermediate the bearings 16 and 56.

OPERATION

In operation, the input pulley 34 is rotated by the belt 36 from a suitable prime mover, such as the engine crankshaft (not shown), rotating the pulley hub 18 and its sleeve extension 54 and the interconnected rotatable housing member 46 therewith. At engine speeds below a predetermined value, the springs 62 (FIG. 2) urge the centrifugal clutch shoes 58 into contact with the clutch drum 50. The centrifugal clutch shoes 58, as well as the clutch drum 50 to which they are connected by the linings 60, are driven by means of the ramp pins 68 which will have rolled up the ramp 64 to become wedged between the ramp 64 and the inner surface 70 of the housing member 46. Such rotation of the clutch drum 50 and its flanged extension 73 drives the carrier member 76 via the ribs 80-and-slots 74 connection therebetween. Inasmuch as the outer ring member 90 is fixed by the outer ring retainer retainer 88 of the fixed second housing member 84, the ball planet pinions 96 are rotated by the carrier member 76 and caused to "walk around" within the outer ring member 90. Such rotation of the ball planet pinions 96 causes the sun member as well as the integrally-formed output shaft 12 to rotate therewith at a predetermined increased speed with respect to the speed of the carrier member 76, depending upon the radii involved. This serves to drive the selected engine accessory 14 at the increased sun member 82 speed, as compared to the input speed of the pulley 34.

Once a predetermined engine speed has been reached, the centrifugal clutch shoes 58 will be urged radially outwardly under the action of centrifugal force against the force of the springs 62. When such disengagement from the clutch drum 50 has begun, and the ramp pins 68 are forced down into the bottom of the converging ramps 64 and 66, complete disengagement will occur without significant slippage because that portion of the normal load due to the wedging action will have rapidly decreased at this point, the carrier member 76 and the sun member 82 will begin to slow down until such time as the output shaft 12, on which the sun member 82 is formed, has attained the slower speed of the input pulley 34 and the pulley hub 18. At the latter speed, the output shaft 12 will be caused to continue to rotate at the input speed by the one-way clutch 114, thereby causing the selected engine accessory 14 to continue to rotate at a 1:1 speed ratio with the input pulley 34 throughout all higher engine speeds.

Now, more specifically with respect to the roller 68-ramp 64 arrangement, the housing member 46 is driven by the pulley 34 below a predetermined speed, say, 1,900 rpm, the reaction torque on the drum 50, which is engaged by the centrifugal clutch shoes 58, causes a wedging action on the rollers or pins 68 (FIG. 4). This wedging action results in an induced normal force between the shoes 58 and the drum 50 which, in turn, keeps the clutch 49 engaged. The induced normal force is a function of the wedge angle $\theta$ (FIG. 4) and the coefficient of friction between the pins 68 and the centrifugal clutch shoes 58 and, as such, can be controlled to make the clutch 49 self-energizing. Specifically, the induced normal load is equal to the torque transmitted between the linings 60 of the shoes 58 and the drum 50 divided by the drive radius thereof, modified by a load factor of $\cot \theta$ minus the pin-shoe coefficient of friction and divided by one plus the coefficient of friction times $\cot \theta$. It may be noted that the force of the springs 62 is sufficient to keep the clutch 49 engaged during start-up.

The centrifugal load resulting from the action of centrifugal force on the centrifugal clutch shoes 58, offset by the force of the springs 62, in conjunction with the abovedescribed wedging effect, is such that the net normal clutch load thereof will serve to keep the clutch 49 engaged up to the predetermined engine speed of 1,900 rpm, and thereafter urge the shoes 58 away from the drum 50. One of the design criteria of this clutch 49 is that the net normal clutch load, due to centrifugal load and spring force, is "zero" at a predetermined lower engine speed, say, 1,600 rpm.

Other criteria are that the normal force induced by the wedging effect is greater than the normal force required to transmit the reaction torque between the centrifugal clutch shoes 58 and the drum 50, and that the reaction torque increases with increased speed of the drum 50.

The clutch 49 load characteristics vs. input speed are illustrated graphically in FIG. 5. The normal clutch load (Curve "A") is the load required to drive without slippage occurring between the centrifugal clutch shoes 58 and the drum 50. The product of this load, the coefficient of friction between the linings 60 and the drum 50, and the drive surface radius determines the amount of torque that can be transmitted, or stated another way, the normal clutch load required to transmit a given torque equals that torque divided by the product of the coefficient of friction and the drive radius.

The applied normal clutch load (Curve "B") is the sum of the induced normal load (Curve "C") resulting from the wedging effect of the roller-ramp system described above and the force (Curve "D") of the springs 62 less the centrifugal load (Curve "E") due to the action of centrifugal force on the clutch shoes 58. As the drive speed increases toward the above-mentioned 1,900 rpm, the required normal clutch load (Curve "A") remains less than the applied load (Curve "B"), and the clutch 49 remains engaged. At the latter speed, the centrifugal clutch shoes 58 begin to pull away from the drum 50 under the action of centrifugal force, and the clutch 49 starts to slip with the result that the drum 50 begins to slow down. This, of course, serves to reduce the applied normal clutch load (Curve "B"), and the reaction torque decreases with the decreasing speed of the drum 50. Once disengagement has begun, complete disengagement will occur rapidly and without excessive slippage because that portion of the normal load due to the wedging action is rapidly decreasing. It should be noted that such disengagement would occur automatically should the torque reach substantially "zero" for any reason, above a predetermined speed.

Specifically, once the centrifugal force (Curve "E") becomes greater than the sum of the force of the springs 62 (Curve "D") and the induced normal load (Curve "C"), such as would occur at 1,900 rpm, the centrifugal clutch shoes 58 move out against the inner surface 70 of the housing 46, and the clutch 49 is disengaged. It may be noted in FIG. 4 that each roller or pin 68 remains in the pocket 69 while the adjacent shoe 58 is forced to rotate in a clockwise direction to move the junction of the ramps 64 and 66 into contact with the pin 68.

As the drive speed decreases from the above drive speed of 1,900 rpm, the resultant normal clutch load equals the net force between the centrifugal load of the centrifugal clutch shoes 58 and the force of the springs 62, the induced normal force being "zero" at this time since the clutch 49 is disengaged. At the predetermined lower drive speed of 1,600 rpm, the spring force (Curve "D") equals the centrifugal load (Curve "E"), and the centrifugal clutch shoes 58 are pulled by the springs 62 back into contact with the drum 50, the shoes 58 rotating in a counter-clockwise direction, as illustrated in FIG. 4, as a result of the ramp 64 and pin 68 contact, and the clutch 49 is reengaged.

Once the engagement process has begun, engagement will be completed rapidly and without undue slippage because the portion of the normal load due to the wedging action is suddenly added to the total normal load.

FIG. 6 Embodiment

Figure 6:
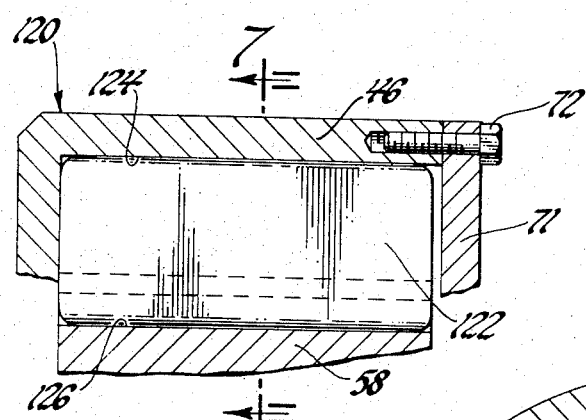
FIG. 6 is a fragmentary cross-sectional view of a modification of a portion of the FIG. 1 structure.
Figure 7:
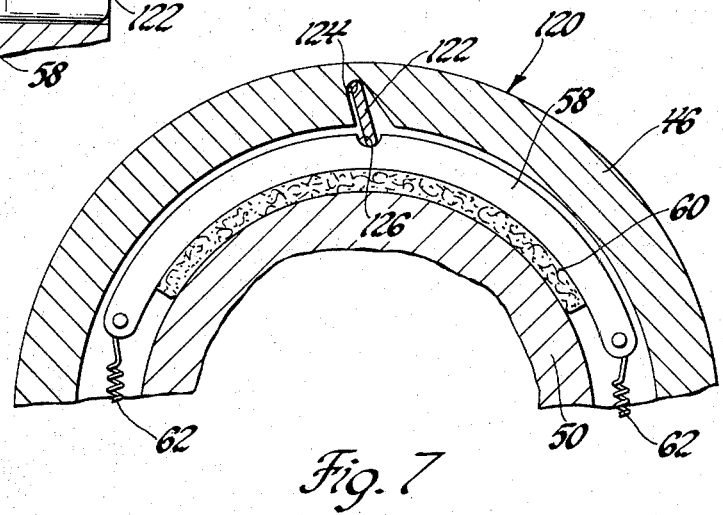
FIG. 7 is a cross-sectional view taken along the plane of line 7—7 of FIG. 6, as if FIG. 6 were a full round view, and looking in the direction of the arrows.

The FIG. 6-7 transmission arrangement 120 is generally similar to the FIG. 1-2 arrangement, and common elements bear the same reference numerals, except that a wedge and slot system is used in lieu of the roller-ramp system. Specifically, a rectangular-shaped wedge 122 (FIG. 7) is mounted in adjacent slots 124 and 126 (FIG. 6) formed at predetermined angles in the housing 46 and the clutch shoes 58, respectively.

Referring to FIG. 6, the drive would be in a clockwise direction with reaction torque being in a counterclockwise direction. Each of the slots 124 and 126 includes diverging side walls so as to permit the "rocking" or tilting action required of the wedge 122 as the shoes 58 move generally radially and slightly rotationally under the action of centrifugal force to effectuate the alternating contacts between the linings 60 and the drum 50, and between the shoes 58 and the housing 46, in a manner similar to that described above relative to FIG. 4.

Air Cooling System

Referring now to FIG. 1, it may be noted that the drum 50-lining 60 contacting surfaces are continuously cooled by air drawn by the pulley 34, by virtue of the latter's pumping characteristics, from between the housing 84 and the cover member 71 of the housing 46, through an opening 130 formed in the cover 71 adjacent one end of the drum 50-lining 60 and thence through a plurality of outwardly tapered openings 132 to a plurality of axial openings 134 formed in the housing 46 adjacent the other end of the drum 50-lining 60 surfaces, and out between the housing 46 and the pulley flange 38.

Lubrication System

Referring again to FIG. 1, it may be noted that a fluid medium, such as a suitable oil, contained within the stationary housing 84/107 is picked up by the carrier member 76, serving as a slinger and having a scoop-like configuration 136 formed on the radial outer edge thereof, thrown radially outwardly along one side of the sun member 82, the ball planets 96, and the outer ring 90, onto the outer ring retainer 88 and through a plurality of radial openings 138 formed in the latter, into an outer chamber 140, from whence the oil flows inwardly under the force of gravity along the other side of the outer ring 90, along and between the ball planets 96 and along the other side of the sun member 82 to a contoured surface 142 formed on the end cap 110 which directs the oil into a plurality of outwardly tapered openings 144 formed through the sun member 82 toward the carrier member 76 for a new cycle.

It should be apparent that the invention provides an improved ball planetary drive coordinated with centrifugal clutch shoes which alternately engage and disengage a clutch drum to respectively drive and release an interconnected carrier member of the planetary unit, while a roller-ramp system, or a wedge-slot system, cooperates with the clutch shoes to efficiently control the disengagement at a predetermined engine speed and the re-engagement at a lower predetermined speed.

It should be further apparent that, if desired for a particular application, the elements could be rearranged such that the pulley serves as an output member with the belt driving any selected engine accessory, and the output shaft serves as an input shaft, being driven by any suitable prime mover. In order to accomplish this bidirectional feature, it would be essential that the angle of the ramp 66 be designed to function in the same manner as was described above relative to the angle $\theta$ of the ramp 64.

While but two embodiments of the invention have been shown and described, other modifications thereof are possible.

We claim:

1. A transmission comprising input and output means; a planetary drive unit including a first member mounted for rotation with said output means, a reaction member, intermediate traction members frictionally contacting said first and reaction members, and a carrier member for driving said traction members; centrifugally-actuated clutch means for operatively connecting said carrier member to said input means; resilient means for urging said centrifugally-actuated clutch means into operational engagement with said carrier member below a predetermined input speed; one-way clutch means operatively connected between said input and output means for operatively connecting said input means to said output means for direct drive of said output means at all input speeds above said predetermined input speed upon said centrifugally-actuated clutch means becoming operatively disengaged with respect to said carrier member in response to the action of centrifugal force; and control means responsive to torque and operating directly between said input means and said centrifugally-actuated clutch means for producing a substantially radial force causing the reengagement of said centrifugally-actuated clutch means to occur at a lower predetermined speed than said above-mentioned predetermined input speed.

2. A transmission comprising input and output means; a planetary drive unit including a first member mounted for rotation with said output means, a reaction member, intermediate traction members frictionally contacting said first and reaction members, and a carrier member for driving said traction members; centrifugally-actuated clutch means for operatively connecting said carrier member to said input means; resilient means for urging said centrifugally-actuated clutch means into operational engagement with said carrier member below a predetermined input speed; one-way clutch means operatively connected between said input and output means for operatively connecting said input means to said output means for direct drive of said output means at all input speeds above said predetermined input speed upon said centrifugally-actuated clutch means becoming operatively disengaged with respect to said carrier member in response to the action of centrifugal force; and roller-ramp means responsive to to torque and operating directly between said input means and said centrifugally-actuated clutch means for producing a force component directed at a predetermined angle with respect to the axis of said clutch means causing the reengagement of said centrifugally-actuated clutch means to occur at a lower predetermined speed than said abovementioned predetermined input speed.

3. The transmission described in claim 2, wherein said roller-ramp means includes a ramp of a predetermined angle formed on the radial outer surface of said centrifugally-actuated clutch means, and a roller mounted intermediate said ramp and said input means.

4. A transmission comprising input and output means; a planetary drive unit including a first member mounted for rotation with said output means, a reaction member, intermediate traction members frictionally contacting said first and reaction members, and a carrier member for driving said traction members; a clutch drum rotatably mounted on said input means and connected for rotation with said carrier member; a pair of oppositely disposed centrifugally-actuated clutch shoes mounted around said clutch drum; resilient means for urging said centrifugally-actuated clutch shoes into frictional engagement with said clutch drum below a predetermined input speed; one-way clutch means operatively connected between said input and output means for operatively connecting said input means to said output means for direct drive of said output means at all speeds above said predetermined input speed upon said centrifugally-actuated clutch shoes becoming operatively disengaged from said clutch drum in response to the action of centrifugal force; and control means responsive to torque and operatively connected between said input means and said centrifugally-actuated clutch shoes for producing a force component directed at a predetermined angle with respect to the axis of said clutch shoes causing the reengagement of said centrifugally-actuated clutch shoes with said clutch drum at a lower predetermined speed than said above-mentioned predetermined input speed.

5. The transmission described in claim 4, wherein said control means includes a ramp of a predetermined angle formed on the radial outer surface of each of said clutch shoes, and a pin rotatably mounted intermediate each of said ramps and said input means.

6. A transmission comprising an output shaft; an input pulley assembly including a pulley hub rotatably mounted on said output shaft, an input pulley secured to said pulley hub, and a sleeve member formed on said pulley hub and rotatably mounted on said output shaft; a planetary drive unit including a fixed housing, a sun member mounted for rotation with said output shaft, an outer ring member secured to said fixed housing, intermediate ball members frictionally contacting said sun and outer ring members, and a carrier member for driving said ball members; a rotatable housing secured to said pulley hub, a clutch drum rotatably mounted on said sleeve member and connected for rotation with said carrier member; a pair of oppositely disposed centrifugally-actuated clutch shoes mounted around said clutch drum; spring means for urging said centrifugally-actuated clutch shoes into frictional engagement with said clutch drum below a predetermined input speed; one-way clutch means operatively connected between said sleeve member and said output shaft for operatively connecting said input pulley assembly to said output shaft for direct drive of said output shaft at all speeds above said predetermined input speed upon said centrifugally-actuated clutch shoes becoming disengaged from said clutch drum in response to the action of centrifugal force; and control means operatively connected between said rotatable housing and said centrifugally-actuated clutch shoes for retaining said centrifugally-actuated clutch shoes in the disengaged position until a lower predetermined speed than said above-mentioned predetermined input speed is attained, said control means including a ramp of a predetermined angle formed on the radial outer surface of each of said clutch shoes, a pocket formed on the radial inner surface of said rotatable housing, and a pin rotatably mounted intermediate each of said ramps and said pocket.

7. The transmission described in claim 6, and an air cooling system for automatically cooling said clutch drum and said clutch shoes.

8. The transmission described in claim 7, wherein said air cooling system includes an opening formed in said rotatable housing adjacent said fixed housing, a first plurality of tapered openings formed through said clutch drum, and a second plurality of tapered openings formed in said rotatable housing adjacent said pulley hub, said pulley assembly serving as a pump to continuously draw air through all of said openings to cool said clutch drum and said clutch shoes.

9. The transmission described in claim 6, and a lubrication system for said planetary drive unit.

10. The transmission described in claim 9, wherein said lubrication system includes a predetermined volume of a fluid medium contained in said fixed housing, slinger means formed on the radial outer edge of said carrier member, a plurality of radial openings formed in the portion of said fixed housing supporting said outer ring member, a chamber formed intermediate said portion of said fixed housing and the outer wall of said fixed housing, a contoured portion formed on an inner end surface of said fixed housing adjacent said sun member, and a plurality of tapered openings formed through said sun member, said carrier member and said slinger means serving to project said fluid medium radially outwardly through said radial openings into said chamber from whence said fluid medium returns under the force of gravity to said contoured portion, said contoured portion directing said fluid medium into said tapered openings for pickup by said carrier member.

11. The transmission described in claim 6, wherein said input pulley assembly serves as an output means, said output shaft serves as an input shaft.

12. The transmission described in claim 4, wherein said control means includes wedge and slot means operatively mounted between said input means and said centrifugally-actuated clutch shoes.

13. The transmission described in claim 12, wherein said wedge and slot means includes a first pair of oppositely disposed slots each having diverging side walls formed at predetermined angles in said input means, a second slot having diverging side walls formed at predetermined angles in each of said clutch shoes adjacent said respective first pair of slots, and a wedge mounted in each of said adjacent sets of first and second slots.

14. The transmission described in claim 13, wherein said wedges are rectangularly shaped with the edges along the length thereof being rounded off and said rounded-off edges being mounted in adjacent first and second slots for tilting therein as required to accommodate the generally radial movement of said clutch shoes under the action of centrifugal force to effectuate the alternating contacts between said input means reaction member and said clutch shoes and between said clutch shoes and said clutch drum at said different predetermined speeds.

15. A transmission comprising input and output means; centrifugally-actuated clutch means for operatively connecting said input and output means when engaged; resilient means for normally causing said centrifugally-actuated clutch means to remain engaged below a predetermined input speed; and control means responsive to torque and operating directly between said input means and said centrifugally-actuated clutch means and including, means for producing a substantially radial engaging force resulting in the reengagement of said centrifugally-actuated clutch means to occur at a lower predetermined speed than said above-mentioned predetermined input speed.

16. A transmission comprising an input member; an output member; a hub member intermediate said input and output members; a rotatable housing secured to said input member, a clutch drum rotatably mounted on said hub member and operatively connected to drive said output member; a pair of oppositely disposed centrifugally-actuated clutch shoes mounted around said clutch drum; spring means for urging said centrifugally-actuated clutch shoes into frictional engagement with said clutch drum below a predetermined input speed; and control means operatively connected between said rotatable housing and said centrifugally-actuated clutch shoes for retaining said centrifugally-actuated clutch shoes in the disengaged position until a lower predetermined speed than said above-mentioned predetermined input speed is attained, said control means including a ramp of a predetermined angle formed on the radial outer surface of each of said clutch shoes, a pocket formed on the radial inner surface of said rotatable housing, and a pin rotatably mounted intermediate each of said ramps and said pocket.

* * * * *

PO-1050
(5/69)

UNITED STATES PATENT OFFICE
CERTIFICATE OF CORRECTION

Patent No. 3,769,858   Dated November 6, 1973

Inventor(s) Richard L. Merrell, Lubomyr O. Hewko, and Richard K. Kepple

It is certified that error appears in the above-identified patent and that said Letters Patent are hereby corrected as shown below:

Column 9, Claim 14, line 40, delete "reaction";

Column 10, Claim 14, line 1, delete "member".

Signed and sealed this 14th day of May 1974.

(SEAL)
Attest:

EDWARD M.FLETCHER,JR.
Attesting Officer

C. MARSHALL DANN
Commissioner of Patents